US007595195B2

(12) United States Patent
Lee et al.

(10) Patent No.: US 7,595,195 B2
(45) Date of Patent: Sep. 29, 2009

(54) MICROFLUIDIC DEVICES FOR CONTROLLED VISCOUS SHEARING AND FORMATION OF AMPHIPHILIC VESICLES

(75) Inventors: Abraham Phillip Lee, Irvine, CA (US); Yung-Chieh Tan, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 716 days.

(21) Appl. No.: 10/777,470

(22) Filed: Feb. 11, 2004

(65) Prior Publication Data

US 2005/0032240 A1 Feb. 10, 2005

Related U.S. Application Data

(60) Provisional application No. 60/446,798, filed on Feb. 11, 2003.

(51) Int. Cl.
 *B01L 3/02* (2006.01)
(52) U.S. Cl. .................. 436/52; 436/180; 422/100; 422/101
(58) Field of Classification Search ............... 204/450; 366/341; 422/100, 101; 435/287.3; 436/52; 516/73
See application file for complete search history.

(56) References Cited

U.S. PATENT DOCUMENTS

| | | | | |
|---|---|---|---|---|
| 4,325,483 | A | * | 4/1982 | Lombardo et al. ........... 209/3.1 |
| 6,221,654 | B1 | * | 4/2001 | Quake et al. .............. 435/287.3 |
| 6,540,895 | B1 | * | 4/2003 | Spence et al. ............... 204/450 |
| 6,733,172 | B2 | * | 5/2004 | Lee et al. .................... 366/341 |
| 2002/0058332 | A1 | | 5/2002 | Quake et al. | 
| 2006/0079585 | A1 | * | 4/2006 | Higuchi et al. ................ 516/73 |

FOREIGN PATENT DOCUMENTS

| | | | |
|---|---|---|---|
| CA | 2 304 644 A1 | * | 4/1999 |
| DE | 198 14 267 A1 | | 4/1999 |
| EP | 1 358 931 A2 | | 11/2003 |

(Continued)

OTHER PUBLICATIONS

Handa, Tetsurou et al., Phospholipid Monolayers at the Triolein-Saline Interface: Production of Microemulsion Particles and Conversion of Monolayers to Bilayers, 1990, Biochemistry, 29, 2884-2890.*

(Continued)

*Primary Examiner*—Walter D Griffin
*Assistant Examiner*—Christine T Mui
(74) *Attorney, Agent, or Firm*—Orrick, Herrington & Sutcliffe LLP

(57) ABSTRACT

Systems and methods that control the size and composition of emulsified droplets, multi-lamellar and asymmetric vesicles, encapsulation of reagents, membrane proteins, and sorting of vesicles/droplets. More particularly, microfluidic devices for controlled viscous shearing of oil-water emulsions of micro- and nano-scale droplets, the subsequent formation of amphiphilic vesicles such as liposomes, polymer vesicles, micelles, and the like, the post-assembly and post-processing of the droplets including splitting, fusing, sorting and the like, polymer emulsions, and the integration of amphiphilic vesicle production-line on a single microfluidic chip. Preferably, the microfluidic device enables oil-water co-flows with tunable viscous shear forces higher than the immiscible interfacial tension forces that generate favorable conditions for droplet formation.

18 Claims, 14 Drawing Sheets

FOREIGN PATENT DOCUMENTS

| | | |
|---|---|---|
| EP | 1 362 634 A1 | 11/2003 |
| WO | WO 02/068104 A1 | 9/2002 |
| WO | WO 2004/002627 A2 | 1/2004 |

OTHER PUBLICATIONS

Lee, Gwo-Bin et al., Micromachined pre-focused MxN flwo switches for continuous multisample injection, 2001, J. Microcech. Microeng., 11, 1-8.*

Lee, Gwo-Bin et al., Hydrodynamic Focusing for a Micromachined Flow Cytometer, 2001, Journal of Fluids Engineer, 123, 672-679.*

Haverkamp et al., "The Potential of Micromixers for Contracting of Disperse Liquid Phases" Fresenius Journal of Analytical Chemistry, Springer, Berlin Germany, vol. 364, 1999, pp. 617-624.

Nisisako et al., "Formation of droplets using branch channels in a microfluidic circuit" SICE Osaka, Japan, 2002, pp. 1262-1264.

Bertsch et al., "3D Micromixers—downscaling large scale industrial static mixers" Proceedings of the IEEE 14th annual international conference on microelectro mechanical systems, MEMS 2001, Interlaken, Switzerland Jan. 21-25, 2001, pp. 507-510.

Thorsen, et al., "Dynamic Pattern Formation in a Vesicle-Generating Microfluidic Device", The American Physical Society (Apr. 30, 2001), vol. 86, No. 18, pp. 4163-4166.

Tan et al., Microfluidic Liposome Generation from Monodisperse Droplet Emulsion—Towards the Realization of Artificial Cells, 2003 Summer Bioengineering Conference, Jun. 25-29, Key Biscayne, Florida, two pages.

* cited by examiner

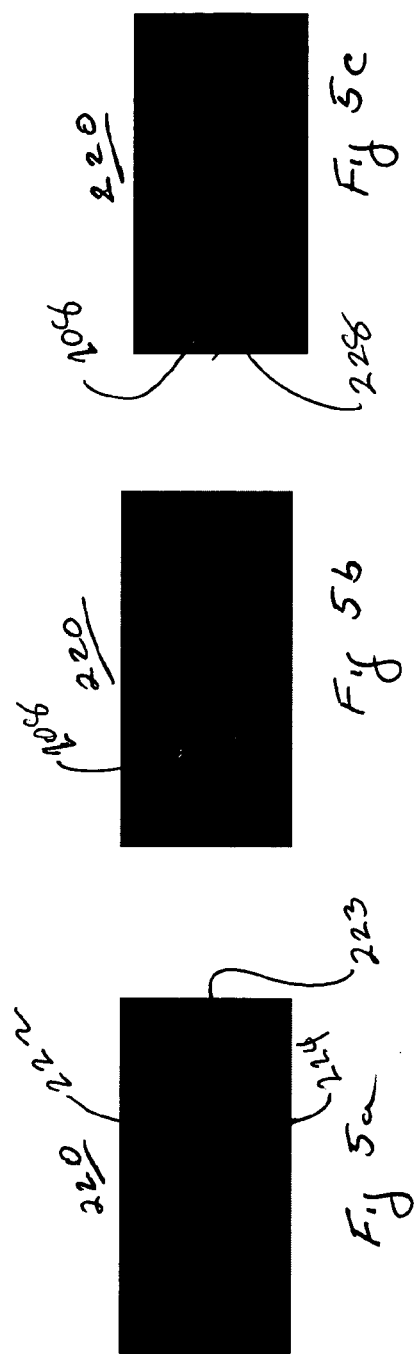
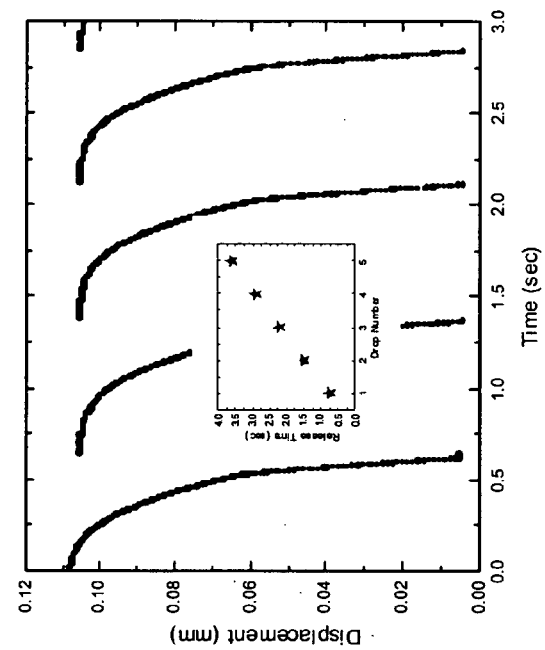

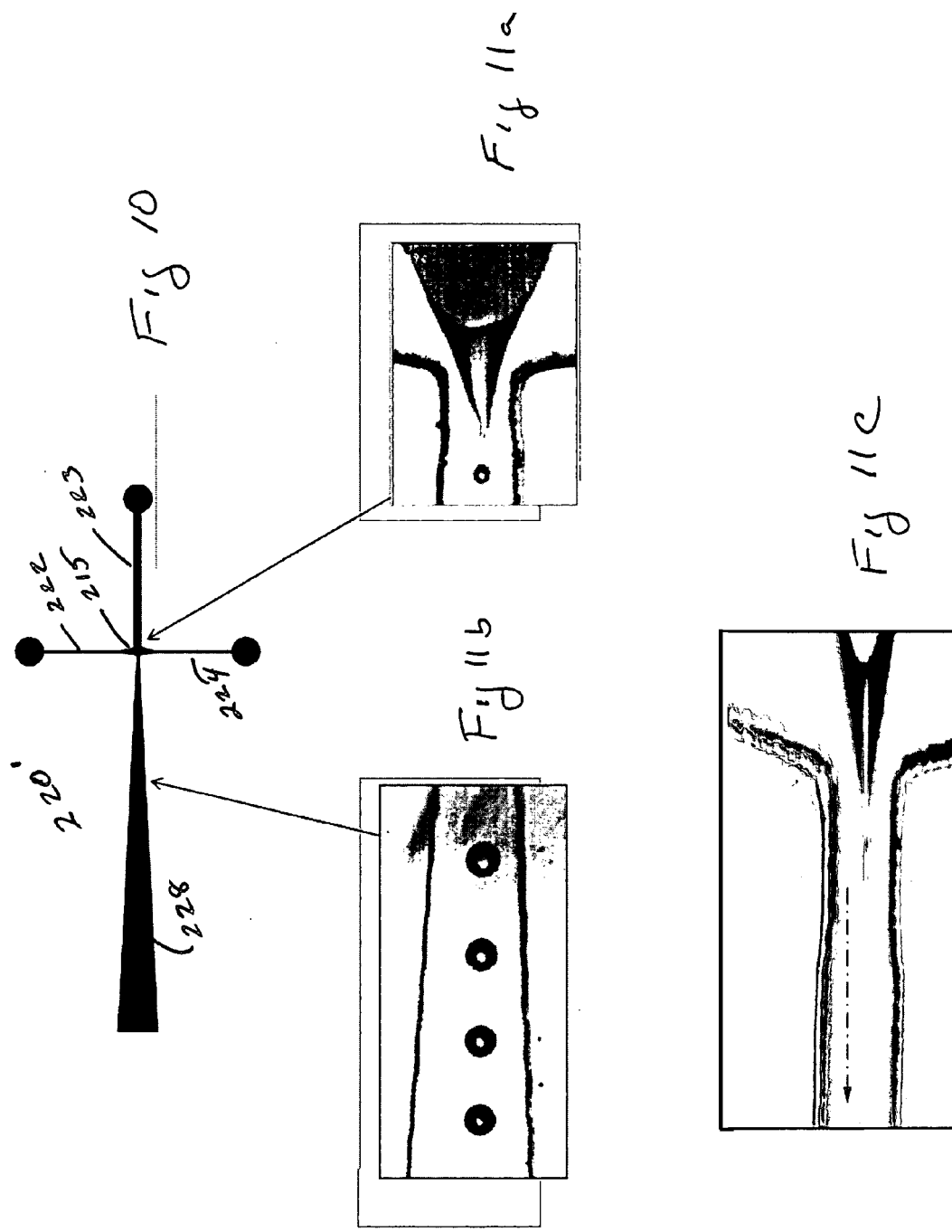

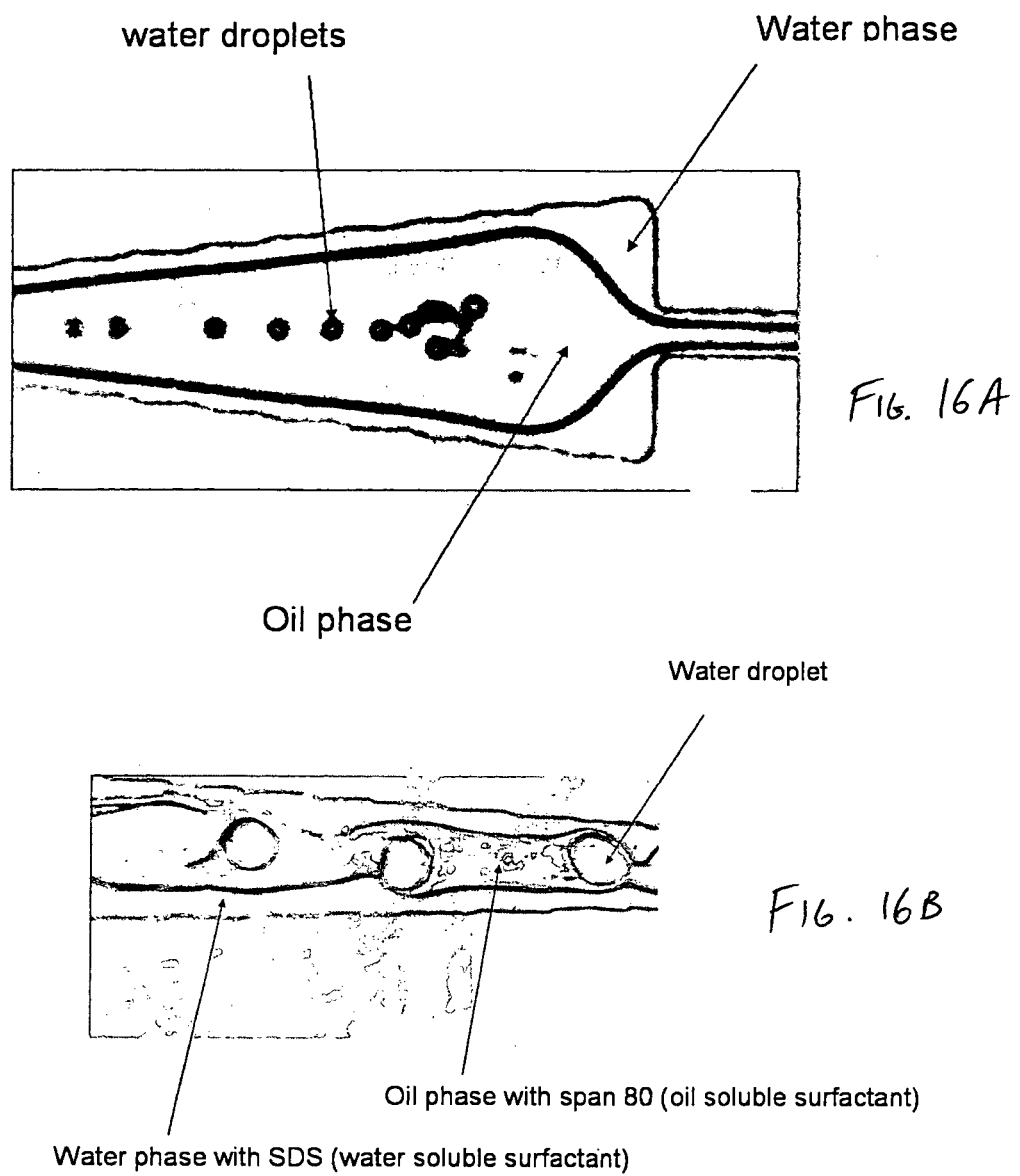
FIG. 16A
FIG. 16B
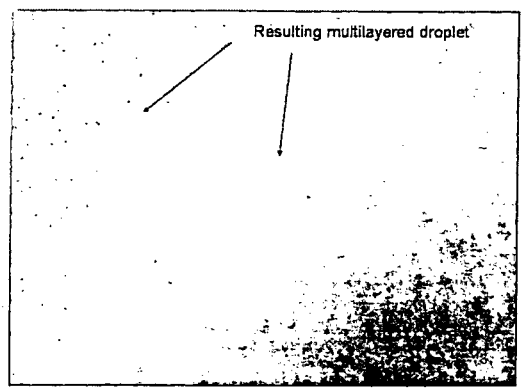
FIG. 16C

MICROFLUIDIC DEVICES FOR CONTROLLED VISCOUS SHEARING AND FORMATION OF AMPHIPHILIC VESICLES

CROSS-REFERENCE TO RELATED APPLICATIONS

This application claims priority to U.S. Provisional Patent Application Ser. No. 60/446,798, filed on Feb. 11, 2003, entitled "Microfluidic Devices for Controlled Viscous Shearing and Formation of Amphiphilic Vesicles." The priority of this prior application is expressly claimed and its disclosure is hereby incorporated by reference in its entirety.

FIELD OF INVENTION

This invention relates to microfluidic devices and, more particularly, to microfluidic devices for controlled viscous shearing of oil-water emulsions of micro- and nano-scale droplets and the subsequent formation of amphiphilic vesicles such as liposomes, polymer vesicles, micelles, and the like. The invention further relates to systems and methods for post-assembly and post-processing of the droplets including droplet splitting, fusing and sorting.

BACKGROUND OF THE INVENTION

Current methods used to produce micro sized droplets include the generation of droplets from a capillary tip of a coflowing stream, a stream breakup under different shear flows, an extrusion through a polycarbonate membrane, and a breakup via induced surface instability of liquid jets. However, these methods do not allow for the simultaneous control of both the droplet generation speed and size. For size control, the only feasible method available has been to extrude emulsified droplets through microporous membranes or microchannels. The size of the droplets, however, are limited to the diameter of the channels or pores. In addition, the bulk mixing processes tend not to allow for individual control of the composition of the droplet to generate precise multilamellar vesicles or asymmetric vesicles on demand.

Recent attempts have been made to generate droplets in microfluidic devices. These droplet generation devices are based on shearing mechanisms using the T-junction designs, flow focusing designs, interfacial tension driven method using microcapillary arrays, and the utilization of thin film electrode to meter droplets using either DEP, EWOD, or electrostatic forces. Most of these efforts focused on controlling droplet sizes but not the droplet generation rate. These devices have very little control over the pressure gradient for droplet formation and variations in the channels of these devices tend to cause drastic effects in the droplet formation process. As a result, none of these processes enable the fabrication of precise bi-layer vesicles in microfluidic devices.

Applications have emerged that can take advantage of precision generation of tiny droplets. These applications range from programmable biochemical assays to drug delivery particles. The control of droplet size and a tight droplet size distribution are paramount to these applications, such that the sizes of the droplets would determine the amount of drug encapsulation, polymer concentration and the drug release rate of the vesicle. The ability to control droplet generation speed would determine the analysis and production efficiency of the system. In addition, controlled assembly of multi-lamellar vesicles can encapsulate multiple reagents or drugs for broad applications in medicine and biology.

Thus, it would be desirable to provide systems and methods that facilitate greater control in the droplet formation process and, more particularly facilitate sheath flow to control viscous shear and pressure gradient during the process.

SUMMARY OF THE INVENTION

The present invention facilitates programmable control of size and composition of emulsified droplets, controlled multi-lamellar and asymmetric vesicles, 100% encapsulation of reagents (e.g. to save precious drugs and reagents), controlled insertion of membrane proteins, and sorting of vesicles/droplets. More particularly, the present invention is directed to microfluidic devices for controlled viscous shearing of oil-water emulsions of micro- and nano-scale droplets and the subsequent formation of amphiphilic vesicles such as liposomes, polymer vesicles, micelles, and the like. The present invention includes various microfluidic device designs for different nanomanufacturing features such as droplet formation speed, droplet size ranges, multi-lamellar amphiphilic layers, asymmetric vesicles and the like. Also included are designs for post-assembly and post-processing of the droplets including splitting, fusing, sorting and the like, and polymer emulsions. The combined features and functions of these devices enable the integrated amphiphilic vesicle production-line, all on a single microfluidic chip. These amphiphilic vesicles are artificial cells with applications in drug delivery (including biomolecular nanomedicine such as DNA, peptides, proteins), combinatorial chemistry, nanoscale chemical reaction chambers, biomolecular devices (power, optical, electrical), and various biosensors.

In one aspect, the present invention includes various microfluidic device embodiments for oil-water co-flows with tunable viscous shear forces higher than the immiscible interfacial tension forces to generate favorable conditions for droplet formation. The higher the shear force the smaller the droplet size. In the preferred embodiments, the design of the immiscible fluid sheath flow to establish stable interfaces with controllable shear forces advantageously enables reproducible and batch fabrication of the devices, and the pressure gradient design advantageously generates favorable conditions for high speed droplet formation.

In another aspect, the present invention includes a method to control the size and generation rate of droplets/vesicles by controlling the flow rates of the immiscible fluid solutions.

In yet another aspect, the present invention includes a method to generate mutli-layer membranes for artificial cells in microfluidic devices.

In a further aspect, the present invention includes various microfluidic post-assembly and post-processing methods to split droplets into smaller droplets, fuse droplets into larger ones, or sort the droplets based on density and size.

Other objects and features of the present invention will become apparent from consideration of the following description taken in conjunction with the accompanying drawings.

DESCRIPTION OF THE DRAWINGS

FIG. 1 is a schematic layout of an amphiphilic vesicle "nanomanufacturing" production line with major components for directed self-assembly of droplets/vesicles and post-assembly manipulation such as sorting, splitting, fusing and the like.

FIGS. 5A-5C comprise photographs demonstrating the aqueous droplet formation in olive oil taken by a high speed camera in a device with a cross-junction vesicle generator design.

FIG. 6 is a graph summarizing the results of this demonstration.

FIG. 10 is a schematic of a cross-junction vesicle generator with an expanded junction area and expanding outlet channel.

FIGS. 11A, 11B and 11C are photographs of the emulsion generated in the vesicle generator shown in FIG. 10.

FIGS. 16A, 16B, and 16C are photographs of multilayer droplet formation using patterned hydrophobic/hydrophilic surfaces.

DETAILED DESCRIPTION OF THE PREFERRED EMBODIMENT

Figure 1:
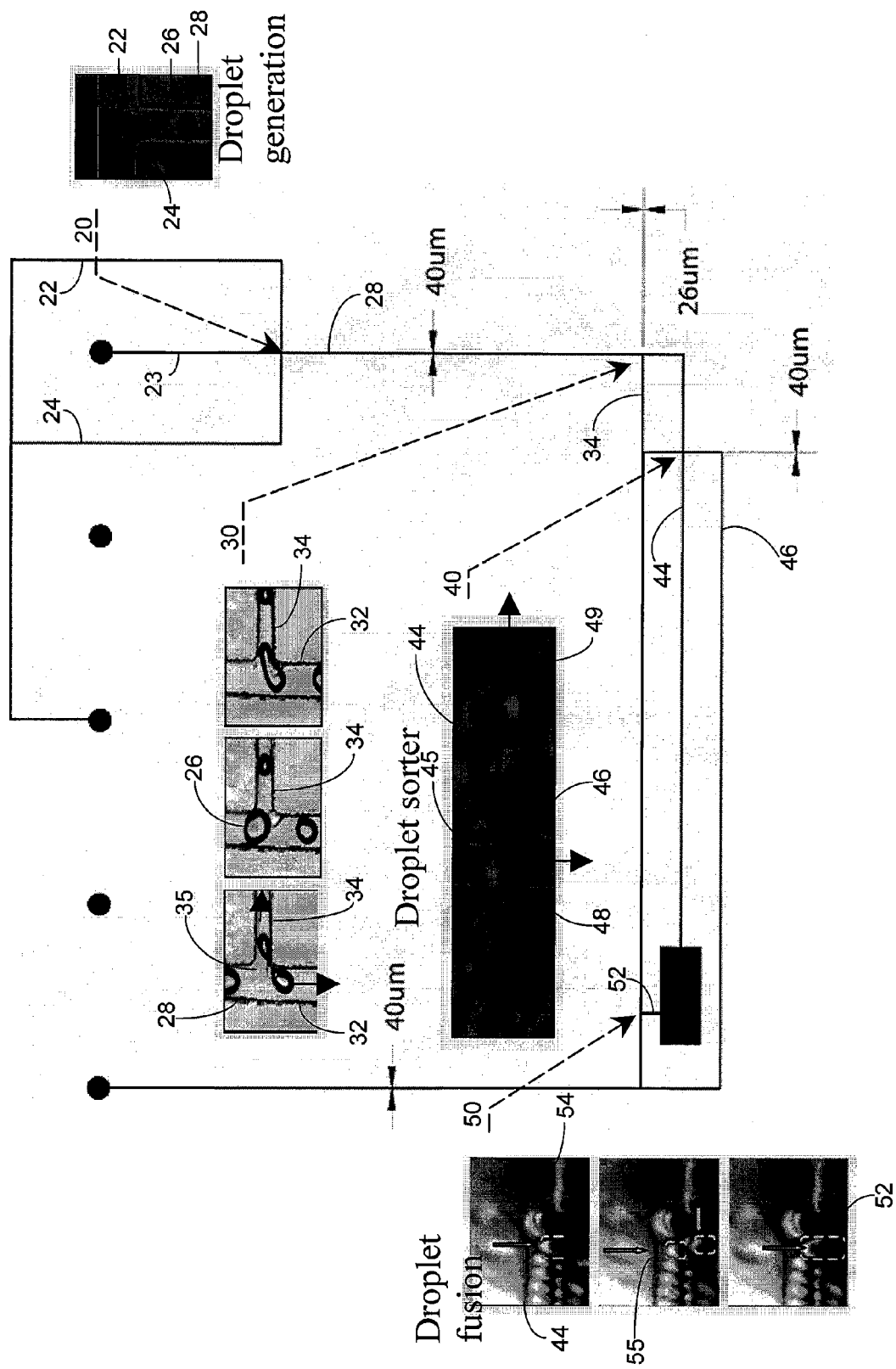

The present invention includes microsystem platforms that enable the automation of complex self-assembly processes. Turning to the figures in detail, FIG. 1 shows a microsystem 10 that is embodied on a single microchip for droplet or vesicle formation 20 in which the droplet size and droplet formation speed can be controlled and which also includes designs for post-assembly and post-processing of the droplets (30, 40 and 50), which is discussed in greater detail below. Advantageously, the microsystem 10 of the present invention, and particularly the droplet or vesicle formation system 20, facilitates programmable control of size and composition of emulsified droplets, controlled multi-lamellar and asymmetric vesicles, 100% encapsulation of reagents (e.g. to save precious drugs and reagents), controlled insertion of membrane proteins, and sorting of vesicles/droplets. This microfluidic platform enables the control of concentrations of solvents, lipids, co-block polymers and the like to alter size, shape, ionic strengths and composition of vesicle membranes to create artificial cells with desired functional properties.

Droplets formed using the techniques of the present invention can be used as transporting and reaction vehicles for nanoliter to femtoliter volumes of reagents.

Figure 2:
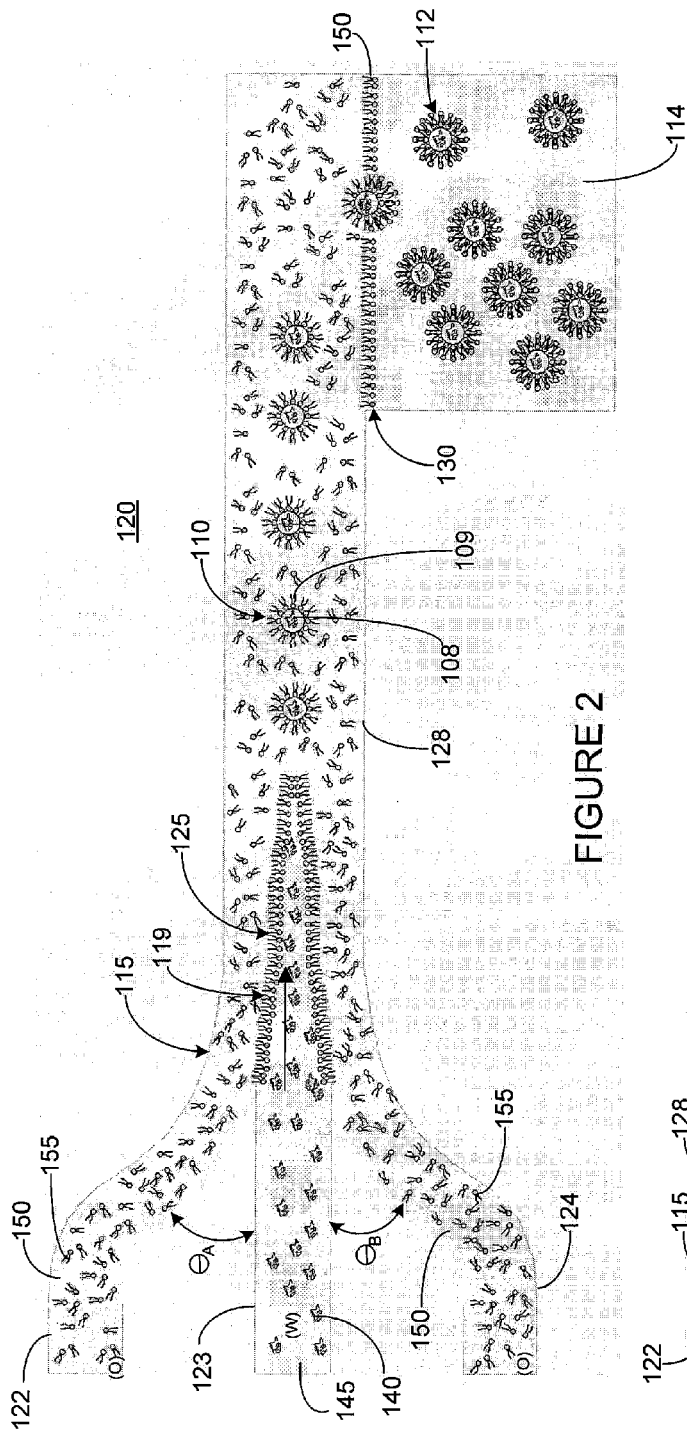
FIG. 2 is a schematic of a microfluidic device for directed self-assembly and nanomanufacturing of amphiphilic vesicles.

Turning to FIG. 2, a preferred process for the formation of mono- and bi-layer amphiphilic vesicles 110 and 112 is shown. First, a sheath flow 125 of two types of solutions is formed at the junction 115 of three (3) inlet microchannels 122, 123 and 124 of a microfluidic device 120. As depicted, the sheath flow can be an immiscible fluid sheath flow such as an oil(O)-water(W)-oil(O) flow or a water-oil-water flow. The sheath flow can comprise a three layered sandwiched flow. The relative flow rates of the oil and water through the microchannels 122, 123 and 124 are preferably controlled to dictate the viscous forces at the immiscible fluid or oil-water interfaces 130 and 129, which determine droplet formation rate and size. Second, by dissolving amphiphiles 150 in the oil solutions 155 a monolayer membrane 109 is formed around or encapsulates the droplets 108 to form monolayer vesicles 110. The monolayer vesicle 110 can then be delivered across another oil-water interface 130 to form a bilayer vesicle 112 upon entering the aqueous solution 114.

As depicted, the central inlet microchannel 123 is an input microchannel for an aqueous solution 145 preferably comprising reagents 140. The reagents 140 can be of any form known in the art. In one embodiment, the reagents 140 include drugs or medicants which have been dissolved in an aqueous solution 145. Preferably the aqueous solution 145 comprises purified DI water(W).

The other two or outer inlet microchannels 122 and 124 are input microchannels for an oil solution 155 preferably comprising amphiphilic molecules 150. The amphiphilic molecules 150 can be lipids which have been dissolved in organic solvents. The amphiphilic molecules 150 can include olive oil, simple phospholipids such as oleic acid, complex phopholipids such as di-palmitoylphosphatidyl choline (DPPC) or dimyristoylphosphatidylcholine (DMPC), and the like. In a further embodiment, the amphiphilic molecules 150 can include surfactants such as SDS, Span, and Tween type surfactants that can stabilize interfaces. In yet another embodiment, the amphiphilic molecules 150 can include polymers. The polymers may include biodegradable polymers such as poly-lactic acid (PLA), poly-glycic acid (PLG) or poly lactic/glycic acid (PLGA). Polymers may also include UV curable polymers or thermally curable polymers. One skilled in the art would understand that the present invention is not limited to these examples. Further, the advantages of using one type of amphiphilic molecule 150 over another depends on the reagent 140 and desired application. In addition, as discussed further below, the two oil solution microchannels 122 and 124 may comprise more than one type of amphiphilic molecule 150.

Two general types of encapsulating methods are used to encapsulate the vesicle 108 with its monolayer membrane 109. The first method comprises a coating resulting from the combination of shearing forces and the solubility difference of lipids in the oil and in the water phase. For example, DPPC, DOPC and other lipids normally not soluble in oleic acid are dissolved into oleic acid by heating to create a clear uniform solution even at room temperature. As lipid interacts with water, the lipids spontaneously coats around the droplet created by shearing of the water and organic phase. In a similar fashion, copolymers may be dissolved in the organic solution. As the copolymers interact with the aqueous solution, the copolymers would be joined to coat the droplet created by the shearing of the water and organic phase.

The second encapsulating method comprises coating due to a chemical reaction that is caused by the reagents between the aqueous phase and the oil phase. Infusing the aqueous phase with a basic solution, such as $CaOH_2$, NaOH or other basic reagents known to those of skill in the art, and the organic or oil phase with reactants such as alginate or oleic acid generates encapsulation emulsions with a shell surface comprised of the products from the chemical reaction.

Either of these two processes produces monolayer vesicles 110 which can be further processed to create bi-layer vesicles 112. The monolayer coated emulsion provides sufficient stability to be processed later into a variety of bilayer emulsions including liposome and asymmetric vesicles, as discussed in detail in regard to FIGS. 13 and 14.

The formation of a monolayer vesicle 110 generally occurs adjacent the junction 115 of the microchannels 122, 123 and 124 in the downstream output channel 128. Preferred embodiments of the present invention are designed to nanomanufacture droplets by controlling the interfacial tension and shear gradients in between oil and water. The monolayer droplet formation technique of the present invention involves the control of both the magnitude and type of flow through the three microchannels 122, 123 and 124 to control droplet size and uses the differences in the flow rates between the water and oil phases to control the speed of droplet or vesicle generation.

Specifically, the droplet breakup mechanism known as end-pinching occurs when high shear forces being applied to a droplet suddenly stop. Due to relaxation of the flow, i.e., as the co-flow of layers of oil and water enters an expanded channel junction 115 or output channel 128, the internal pressure gradient inside the droplet induces surface instability and breaks off the droplet in the process. In the channel junction 115, the flow before the output channel 128 acts as the initiator for producing the high shear on the droplet 108. As the flow passes through to the output channel 128, the flow immediately decelerates producing the droplet end-pinching effect. Depending on the pressure gradients desired, the geometries of the three microfluidic channels 122, 123 and 124 and the output channels 128 may be altered.

Figure 3:
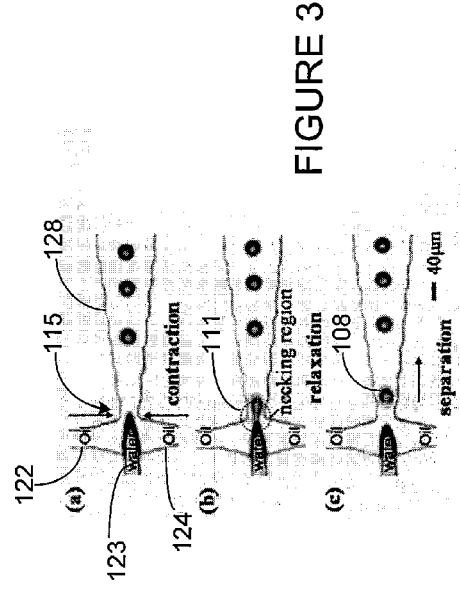
FIGS. 3A, 3B and 3C are photographs depicting the formation of a vesicle or droplet.

FIGS. 3A, 3B and 3C, which are a sequence of photographs showing the formation of a droplet/vesicle in a cross-junction vesicle generator, provide a detailed depiction of the droplet breakup mechanism. The droplet generation process can be roughly divided into 3 stages: contraction (FIG. 3A), relaxation (FIG. 3B), and separation (FIG. 3C). During the contraction phase, as the water (W) and oil (O) stream flow through the channel junction 115 and into the output channel 128, the curvature of the water tip increases to equilibrate with the pressure of the oil phase. During the relaxation phase, the change in curvature soon forms a necking region 111 that creates a pressure gradient at the tip of the stream. With the combination of the shear force from the oil stream, the net pressure inside the droplet 108 and the changes in the curvature of the surface, the droplet 108 detaches from the stream as shown in the separation phase (FIG. 3C).

Using this droplet breakup mechanism, droplets have been formed which range in size from 150 µm to less than 1 µm in diameter. Droplet generation rates using these techniques range from 100 msec/droplet to less than 0.2 msec/droplet.

Figure 8:
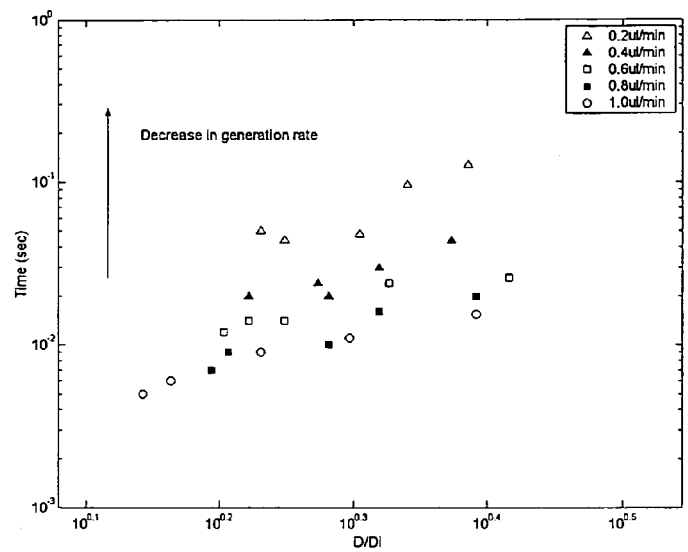
FIG. 8 is a graph showing droplet generation rate for a given droplet size.

Simultaneous control of droplet size and generation rate may be achieved using the devices and methods of the present invention. Normally, the larger the droplet the slower the generation rate which may be a limitation to the throughput of the device. However, since droplet size is controlled by the flow rates of the outer inlet channels to generate shear forces and the central inlet channel can control the filling up of the droplets (or generation rate), by increasing the flow rate of all the channels, or additionally, by increasing the channel size, the generation rate for larger droplets can be optimized. It is possible to map out the droplet size versus generation rate plot to identify the space to control both simultaneously. FIG. 8 is such a plot for one particular device that can be used to determine the droplet generation rate for a given droplet size. D/Di is the ratio of the diameter of the droplet over the width of the channel (40 µm) and time is defined per droplet.

The relative flow rates of the three microchannels 122, 123 and 124 are preferably controlled to dictate the viscous forces at the oil-water interfaces, which determines droplet formation and size. In addition, the size of the droplets formed in the present invention can be controlled by varying the viscosity of the aqueous and oil solutions, the flow rates of these solutions, and the size of the channels. When the droplet sizes are equal or smaller than the width of the output microchannel 128, droplet size is consistent with the capillary number (Ca), which is described as the balance between interfacial tension and shear force. The actual capillary number varies with the flow types applied to the droplets.

$$Ca = \frac{\eta_c \gamma a}{\sigma} \quad (1)$$

In the expression above, $\eta_c$ is the viscosity of the continuous phase, $\gamma$ is the shear rate of the continuous phase, and the product of the two is equal to the magnitude of the shear force that drives droplet breakup. Opposing the shear force, the capillary force acts to keep the droplet from deformation and is equivalent to the ratio of $a$, the radius of the droplet divided by $\sigma$, the interfacial tension between water and oil interface.

The shear rate of oil in the channel can be estimated as:

$$\gamma = \frac{Q_o}{AW_c} \quad (2)$$

A, $W_c$, and $Q_o$ are the cross sectional area of the channel, the width of the channel, and the flow rate of the oil phase. Incorporating eq(1) into eq(2) yields a formulation relating the oil flow rate to the generated droplet radius.

$$a = \frac{W_c A \sigma}{\eta_c Q_o} \quad (3)$$

Figure 12:
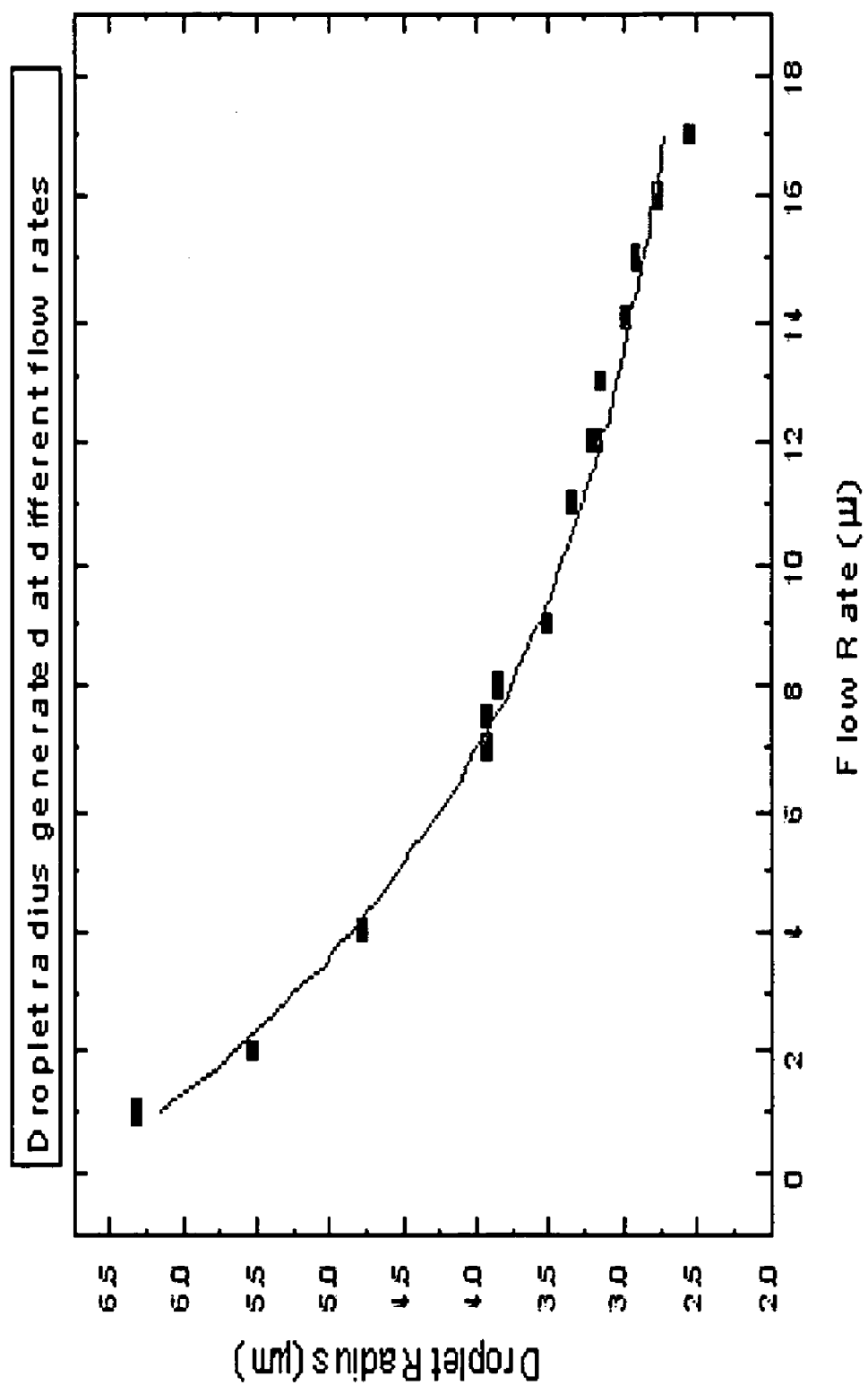
FIG. 12 is a graph of droplet radius versus oil solution flow rate.

As depicted in FIG. 12, Equation (3) indicates that the radius of the droplet varies inversely with the oil flow rate. Expanded junction designs, such as the diamond shape shown in FIGS. 3A-C and 10, or those inherent in the bowtie designs shown in FIGS. 4C, 7A-C and 9, enable higher oil flow rates.

The control of the rate of droplet generation is achieved through adjusting the infusion rate of the water phase. The droplet generation rate reflects the different time scales in the 3 stages of droplet formation process illustrated earlier. Prior to the contraction phase, the time required for the water stream to fill a droplet with size that equilibrates with the surrounding oil pressure is characterized by $T_f$. During the contraction phase, the viscous stress shears the surface of the water stream and the time of shearing is $T_\gamma$. Lastly, after the contraction phase, as the droplet reaches the widened channel, the shear rate of the oil phase is weakened and the restoration time of the capillary force, $T_\sigma$, is required to pinch off the droplet. The three time scales are expressed below:

$$T_f = \frac{4\pi a^3}{3Q_w} \quad (5)$$

$$T_\gamma = \gamma^{-1} \quad (6)$$

$$T_\sigma = \frac{\eta_c a}{\sigma} \quad (7)$$

When $Q_w=Q_o$ ($Q_w$, water phase flow rate; $Q_o$, oil phase flow rate), the maximum difference in droplet size is approximately 10% allowing the different time factors of droplet generation to be compared. According to Table I, the value of $T_f$ exceeds all other time scales, and as such, $T_f$ dominates the actual formation time. From equation (5) this scaling would predict that the droplet generation rate varies inversely to the flow rate of the water phase.

TABLE I

Time of breakup, time of formation and the experimental time of droplet generation are shown.

| $Q_w = Q_o$ (µl/min) | $T_f$ (ms) | $T_\gamma$ (ms) | $T_\sigma$ (ms) | $T_{exp}$ (ms) |
|---|---|---|---|---|
| 1 | 30.154 | 3.855 | 0.087 | 15.5 ± 0.5 |
| 0.8 | 37.692 | 4.819 | 0.087 | 20 ± 2 |
| 0.6 | 59.232 | 6.426 | 0.092 | 26 ± 2 |
| 0.4 | 66.212 | 9.639 | 0.084 | 44 ± 2 |
| 0.2 | 144.490 | 19.277 | 0.862 | 128 ± 8 |

The flow rate for the oil microchannels 122 and 124 and for the aqueous microchannel 123 are preferably controlled by a pump. The pump can be a syringe pump, an on-chip syringe pump, a pressure-driven pump, or any other pump known in the art. In a further embodiment the flow rates may be controlled by a magnetohydrodynamic (MHD) fluidic manifold, that can individually control the pressure/flow rates of each microchannel. Typically, flow rates are in the range of about ~0.5 µl/min, to ~20 µl/min, however, the present invention is not limited to these ranges.

As depicted in FIG. 2, the microfluidic device 120 preferably comprises at least three inlet microchannels 122, 123 and 124 used to direct co-directional flows of oil and aqueous solutions toward a channel junction 115 and into an output channel 128. In an alternative embodiment, the junction 115 can comprise more than three inlet microchannels.

The microchannels 122, 123, and 124 of the microfluidic device 120 are preferably molded out of PDMS in an SU-8 mold or are injection molded from a variety of moldable plastics known in the art such as polystyrene or polycarbonate. Other microfabrication materials such as silicon or glass can also be used since photolithography and etching can define microchannels on those substrates. The width of the microchannels 122, 123 and 124 are generally in the range of about 20 µm to 100 µm and more preferably in the range of about 30 µm to 50 µm. As the widths of the microchannels drop below 20 µm towards 1 µm and below, the microchannels are preferably formed using micro-lithography techniques.

Once the microchannels 122, 123 and 124 are formed, the microchannels are then bonded to a substrate to form a microfluidic chip. The substrate is preferably formed from glass, polystyrene, PDMS or the like. Though generally in the range of about 1 mm to 7 mm, the size of the microfluidic chip can vary depending on the application.

Figure 4C:
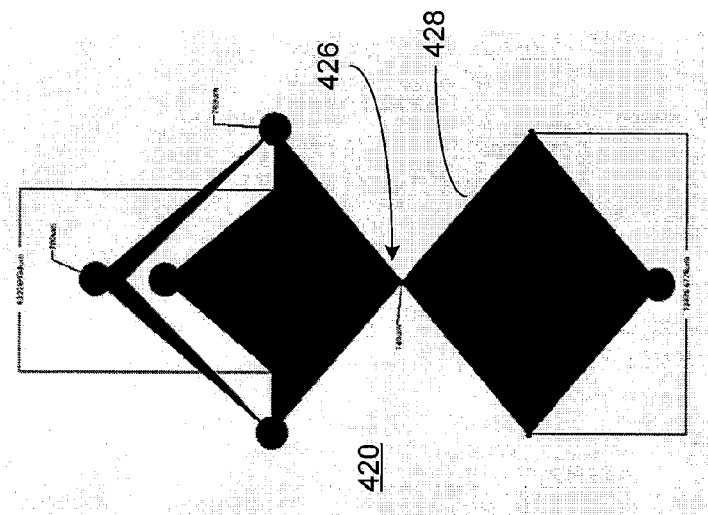
FIG. 4C is a schematic of a bowtie vesicle generator.
Figure 4A:
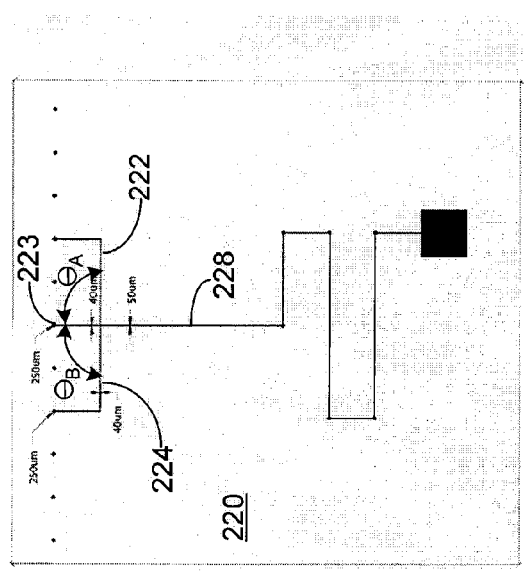
FIG. 4A is a schematic of a cross-junction vesicle generator.
Figure 4B:
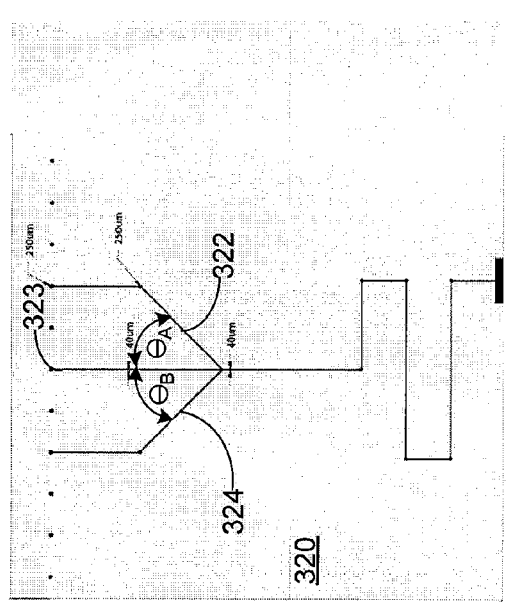
FIG. 4B is a schematic of a fork-junction vesicle generator.

As depicted in FIGS. 4A, 4B and 4C, the configuration of the inlet microchannels, the channel junction and the outlet channel can vary. Some exemplary embodiments for generating droplets or amphiphilic vesicles include (a) a cross-junction vesicle generator 220 shown in FIG. 4A, (b) a fork-junction vesicle generator 320 shown in FIG. 4B, and (c) a bowtie vesicle generator 420 shown in FIG. 4C, each representing a different condition and control on the interfacial tension and the shear rates.

The angle of entry $\theta_A$ and $\theta_B$ for the two inlet oil flow microchannels (122 and 124, 222 and 224, 322 and 324) relative to the inlet aqueous solution microchannel (123, 223 and 323) is generally in the range from about 0 to about 90 degrees (FIGS. 2 and 4A-B). Preferably, the angle of entry $\theta_A$ and $\theta_B$ for the two inlet oil flow microchannels (122 and 124, 222 and 224, 322 and 324) relative to the inlet aqueous solution microchannel (123, 223 and 323) is between about 10 and 60 degrees and most preferably is in the range of approximately 25 to 40 degrees. The angle of entry $\theta_A$ and $\theta_B$ both oil flow microchannels (122 and 124, 222 and 224, 322 and 324) relative to the aqueous solution microchannel (123, 223 and 323) can be equal. Alternatively, the angle of entry $\theta_A$ and $\theta_B$ one of the two oil flow microchannels (122 and 124, 222 and 224, 322 and 324) can be greater than the angle of entry $\theta_A$ and $\theta_B$ for the other oil flow microchannel (122 and 124, 222 and 224, 322 and 324).

FIGS. 5A-5C are photographs demonstrating the water-in-oil aqueous droplet formation method in the cross-junction vesicle generator 220 illustrated in FIG. 4A. These photographs demonstrate the end-pinching droplet formation which occurs because of the applied shear forces. The microchannel width of the T junction or cross-junction microfluidic device used in the experiment is 40 µm. In FIG. 5A, the aqueous solution flows from the horizontal channel 223 from right to left. Shear forces are applied from each of the two vertical channels 222 and 224. In FIG. 5B, a droplet 208 has pinched off the tip of the aqueous solution. In FIG. 5C, the droplet travels across the horizontal output channel 228. Displacement of droplets released from the T junction is shown plotted as the function of time in FIG. 6. Initially the 'seed' drop nucleates for a small time, then the drop slowly grows and finally, after the release, the drops moves faster. This corresponds to the plateau region in the curve, small-sloped line and large-sloped line. The inset curve shows the number of droplets released as a function of time. The straight line implies the droplets are released at equal intervals of time.

Figure 7B:
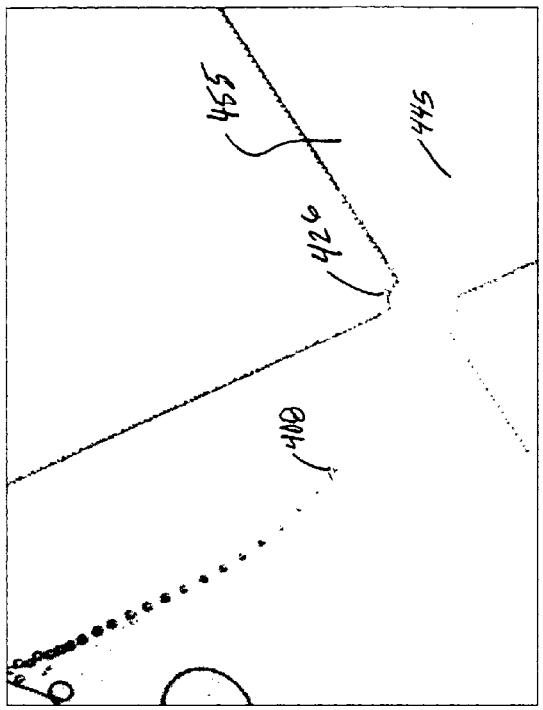
FIGS. 7A-7C comprise photographs demonstrating water-in-oil droplet formation in a microfluidic device with a bowtie vesicle generator design.
Figure 7A:
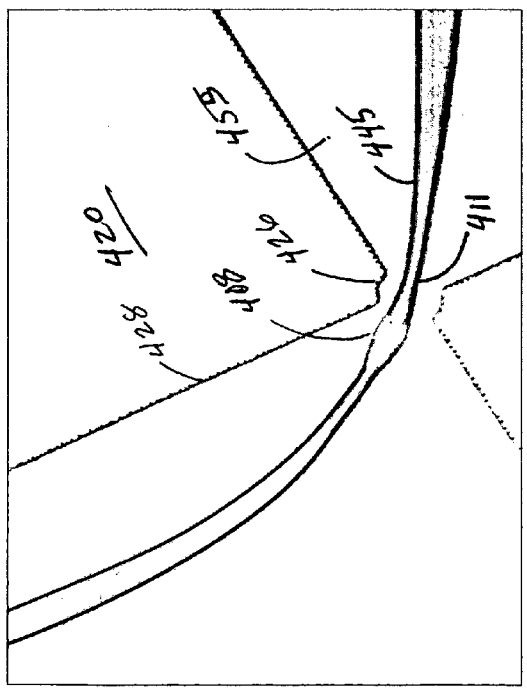
Figure 7C:
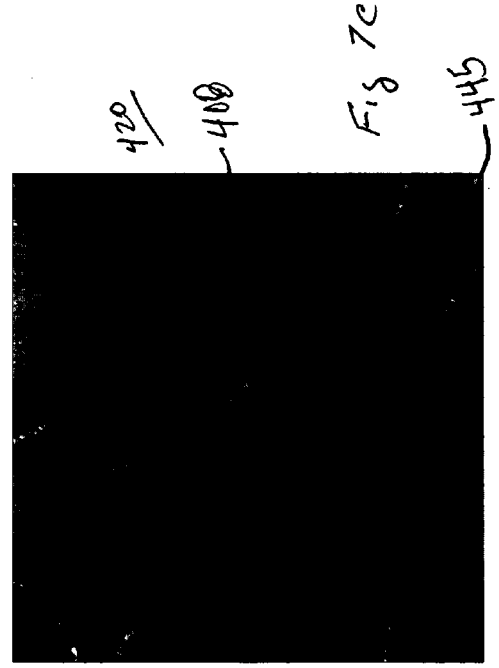

FIGS. 7A-7C comprise photographs demonstrating water-in-oil droplet formation in the bowtie microfluidic device 420 illustrated in FIG. 4C. In FIG. 7A, a water stream 445 is sandwiched by oil flow 455 as the stream forms a necked region 411 adjacent the necking junction 426 and expands to start forming a droplet 408 in the output channel 428. As the ratio between oil and water flow rate is increased, the interfacial tension can no longer sustain a laminar flow line. As a result, droplets 408 with a diameter of approximately 25 µm are formed (FIG. 7B). Droplets with a diameter of approximately 150 µm are shown extruding through the necking junction 426 at about 90 droplets per second in FIG. 7C.

The "cross-junction device" (FIGS. 6A-6C) generates droplets at 1-2 drops/sec whereas the bowtie device (FIGS. 7A-7C) was much faster at 90 drops/sec. The cross-junction droplet generation rate can be increased in the cross-junction generator with higher flow rates.

Figure 9:
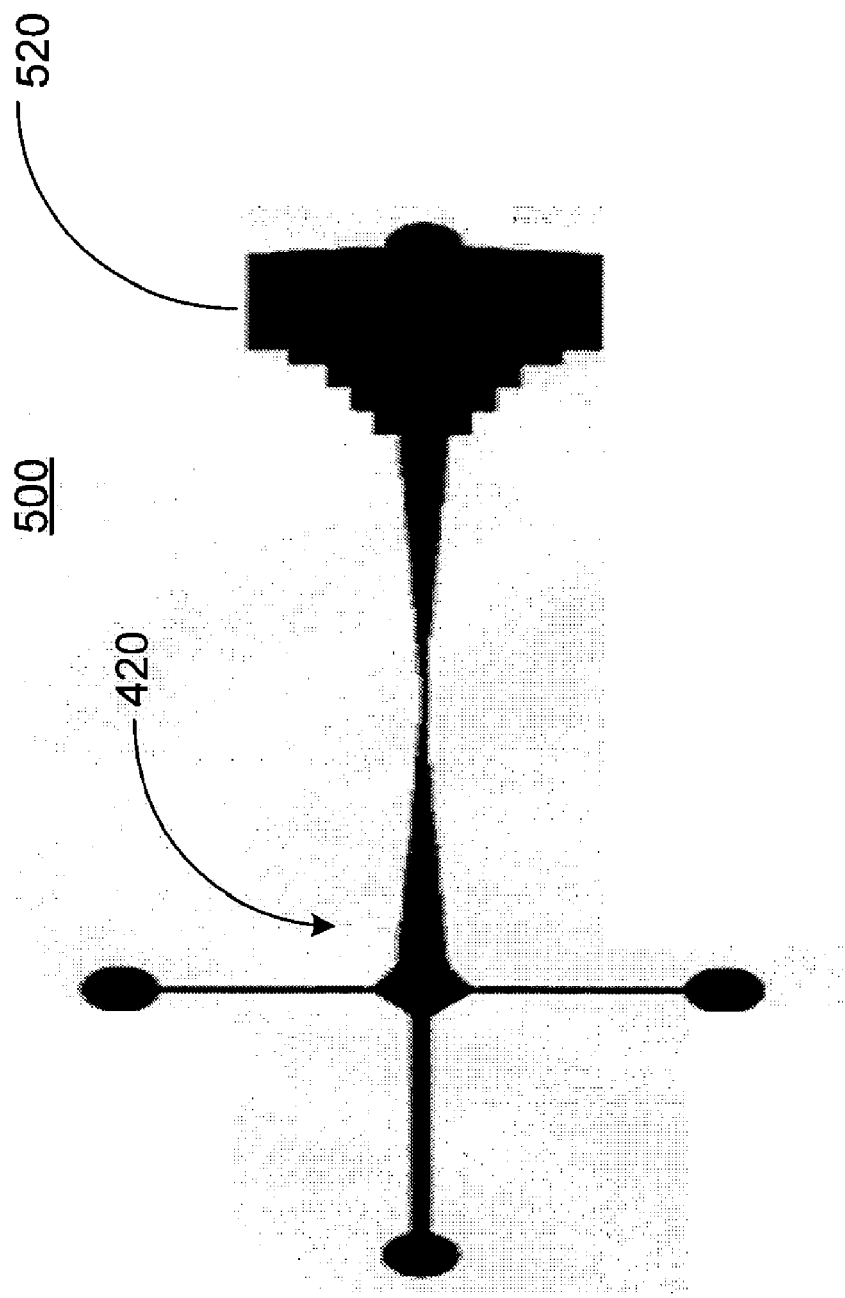
FIG. 9 is a schematic of a bowtie vesicle generator coupled to a ladder channel.

FIG. 9 illustrates a vesicle generator incorporating an expanded junction. More particularly, the emulsion generation device 500 includes a bowtie vesicle generator 420 coupled to a ladder microchannel 520. The device 500 is designed to control the local shear forces between the co-flow of organic and aqueous boundary interface to generate monodispersed droplet emulsions.

FIG. 10 provides another exemplary embodiment of a cross-junction vesicle generator 220' having inlet channels 222, 223 and 224 and an outlet channel 228, and incorporating an expanded junction 215 design. As shown in FIGS. 11A and 11B, emulsions were generated at the cross junction 215 allowing the size of the droplet emulsion to be manipulated by the flow rate of the oil phase. As indicated in FIG. 12, the radius of the droplet varies inversely with the flow rate of the oil phase. Under this design emulsions as small as 0.5 μm in radius have been generated as shown in FIG. 11C.

Figure 13:
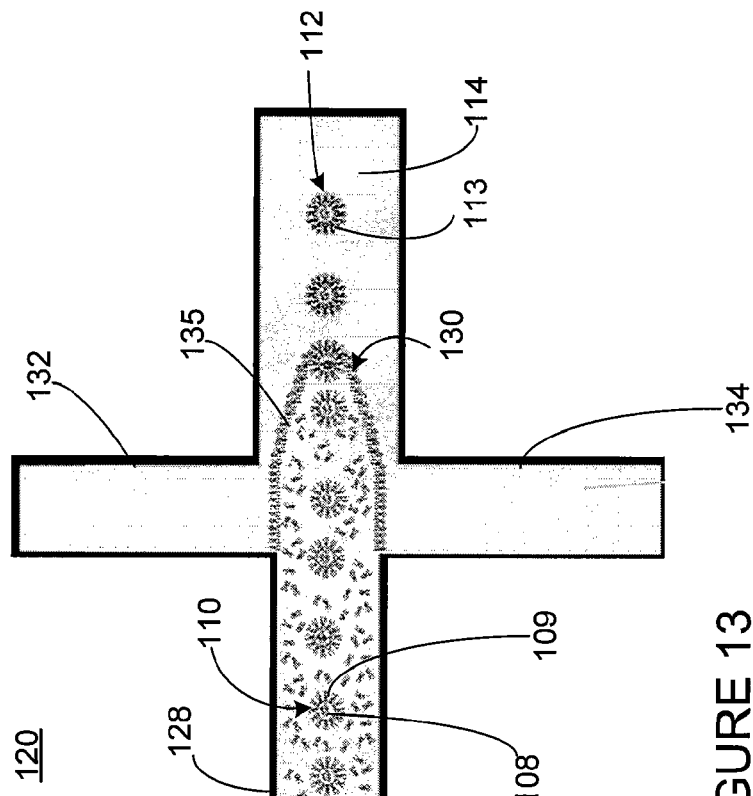
FIG. 13 is a schematic of a microfluidic device for directed self-assembly and nanomanufacturing of multi-layer amphiphilic vesicles.
Figure 14:
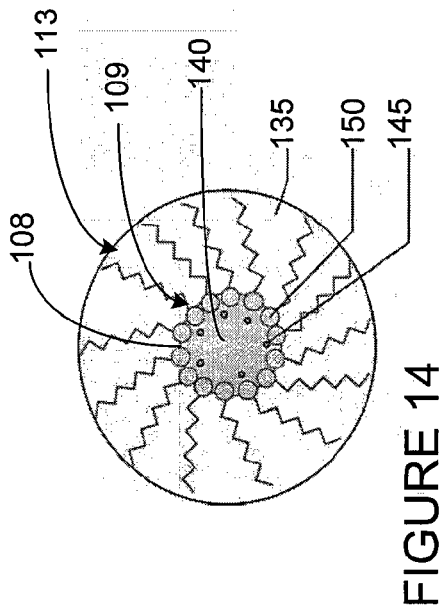
FIG. 14 is a schematic of a multilayer amphiphilic vesicle.

As depicted in FIG. 13, after formation, the monolayer vesicle 110 is delivered across an oil-water interface 130 to form a bilayer vesicle 112 upon entering the aqueous solution 114. The oil-water interface 130 is formed by water or an aqueous solution flowing through two water inlet channels 132 and 134 and an outlet channel 138. The amphiphilic molecules 135 of the oil-water interface 130 may be the same type of amphiphilic molecules 150 as in the oil microchannel solvent 155. It is also possible to generate asymmetry in the bi-layers such that the inner and outer amphiphilic molecules are different. This is significant since biological membranes are, in fact, a fluid composition of lipids and other amphiphilic molecules. It will be possible to dynamically load the bi-layer amphiphilic vesicles 112 with different molecules, both in the membrane and encapsulated within it. Asymmetric vesicles are created through post encapsulating monolayer coated vesicles 110 with a second or more layers of encapsulating agents including alginate, lipids, polymer, surfactants and the like. For example, as depicted in FIGS. 13 and 14. an oleic acid coated monolayer vesicle 110 may be encapsulated by alginate gels 113 to form a hard shell around the permeable oleic acid monolayer 109. These vesicles will allow multiple drugs to be encapsulated inside a single unit providing a platform for a multiple drug delivery system.

Figure 15:
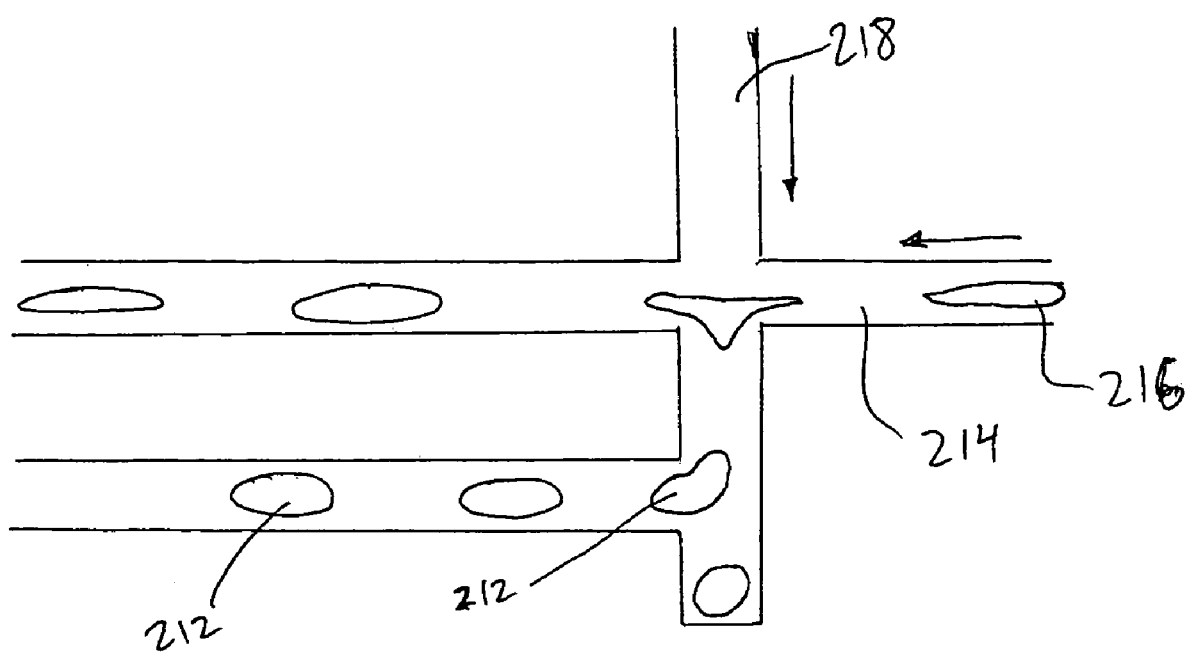
FIG. 15 is a schematic of a microfluidic device for multi-layer droplet formation.

Turning to FIG. 15, multi-layer droplets side extrusion channels may be formed. In this embodiment, a large droplet 216 is generated in a generation channel 214. The large droplet 216 is later sheared by another flow channel 218 perpendicular to the generation channel 214. As a result of this shearing, a second liquid encapsulates the large droplet 216 to form a two layer droplet 212. This process may be repeated as desired to generate multi-layer droplets in a continuous fashion.

Multi-layer droplets may also be formed using patterned hydrophobic/hydrophilic surfaces. Multi-layered droplets, or compound drops, are created in microfluidic devices through controlling the surface properties of the microfluidic channels. Microchannels with hydrophilic surfaces allows water to spread and resist the spreading of oil. In contrast, microchannels with hydrophobic surfaces allow oil to spread and repels the spreading of water. Using a combination of these two surfaces, a compound, multi-layer droplet is generated through sequential generation of one type of emulsion followed by a second generation in an opposite medium. For example, a compound drop of water-oil-water is generated from water in oil emulsion followed by the generation of oil in water emulsion (FIG. 16A). If polymers, lipids, or other chemical compounds are dissolved or dispersed in the medium, once it is encapsulated inside a compound droplet this will produce multilayered vesicles because of the stability of the encapsulated compounds. Alternatively, since surfactant can act as a stabilizing agent between immiscible surfaces, a compound droplet can also be created through using a combination of water soluble and oil soluble surfactants as shown in FIGS. 16B and 16C.

Returning to FIG. 1, which illustrates the droplet post-assembly and post-processing components in one integrated design, is a schematic layout of an amphiphilic vesicle "nanomanufacturing" production line 10 with major components for directed self-assembly of droplets/vesicles 20 and post-assembly manipulation such as sorting 30, splitting 40, fusing 50 and the like. Manipulation of the droplets may be advantageous to prepare the droplets for digital bioassays, screening, or for drug delivery.

Figure 18:
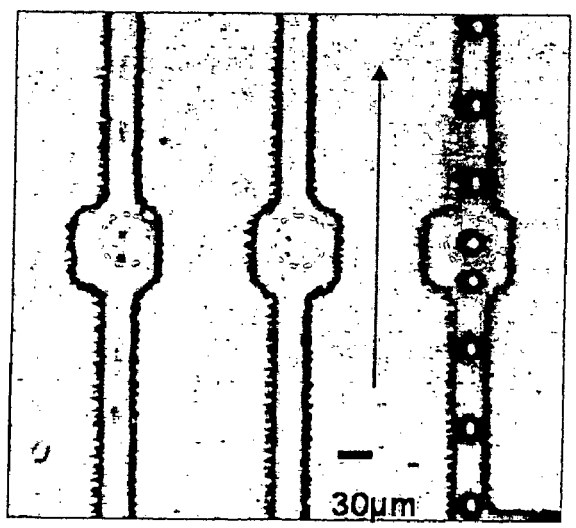
FIG. 18 is a photograph of the generation of nanoparticles by a bifurcation junction.

In particular for droplet generation 20, droplets 26 are shown formed in a cross-junction device having oil and water solution inlet channels 22, 24 and 23, and an output channel 28. For splitting 30, droplets 26 enter a bifurcation 35 of the microfluidic channels and are pressurized into both microchannels 32 and 34 at this junction 35. The inlet channel 28 is connected to two or more daughter channels 32 and 34. The width of the daughter channels may vary depending on the desired application, but the width is generally in the range of 1 μm to 100 μm. A pressure gradient can be created by differences in the pressures in the inlet channel 28 and daughter channels 32 and 34. The pressures can be controlled by altering the width and/or length of the parent and daughter channels 28, 32 and 34 or by modifying the external pressure, for example by applying higher flow rates. The two pressures stretch the droplets 26 and the corner 37 of the channel walls assists in shearing apart the droplets 26. Variations in the size of the daughter microchannels 32 and 34 can also be used to create split droplets of equal or unequal size. For example, in a splitter system with two daughter channels 32 and 34, one daughter channel 32 may have a width of approximately 40 μm and the other daughter channel 34 may have a width of approximately 60 μm. This splitter system 30 allows for the creation of two droplets which are of different sizes. Nanoparticles may also be generated by a bifurcation junction with unequal daughter channels. Through unequal fission, droplets with very small diameters may be created as shown in FIG. 18. Droplets as small as less than 1 μm have been generated from the splitting of 30 μm droplets.

For the sorter 40, droplets passing from left to right are sorted by velocity. Again, at the bifurcation 45, there are two channels 44 and 46 with different pressure drops to "attract" the droplets. The higher the velocity, the more likely the droplet is able to cross-over to the horizontal channel. Since the smaller droplets 49 have higher velocity they will be collected in the horizontal channel 44 and the larger ones 48 will drop into the vertical channel 46.

Figures 20A, 20B:
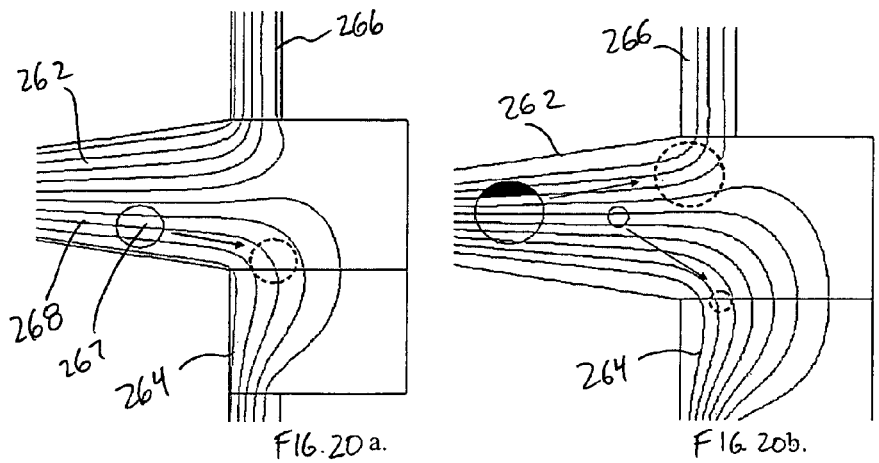
FIGS. 20A and 20B are schematics demonstrating a method of sorting.

Droplets of different sizes may also be sorted as shown in FIGS. 20A and 20B. In this embodiment, droplets may be sorted by having an input channel 262 meet two daughter channels 264 and 266 at a T-junction. The streams 268 which direct a droplet to the lower daughter channel 264 or upper daughter channel 266 may be modified based on the relative flow rates of the two daughter channels 264 and 266. In FIG. 20A, the complete suspension of the droplet 267 in the lower stream moves the droplet 267 to the bottom channel 264. If the flow rate of lower channel 264 is increased, the number of streams 268 moving toward the lower channel increases (FIG. 20B). This increases the droplet size that can be removed by the velocity gradient between the upper daughter channel 266 and the lower daughter channel 264.

Satellite droplets 281 can be separated from larger droplets 284 as shown in FIGS. 21A-22C. Satellite droplets 281 of less than 1 μm in diameter can be generated, separated and then collected in the microchannel without using surfactants.

Figures 21A, 21B, 21C:
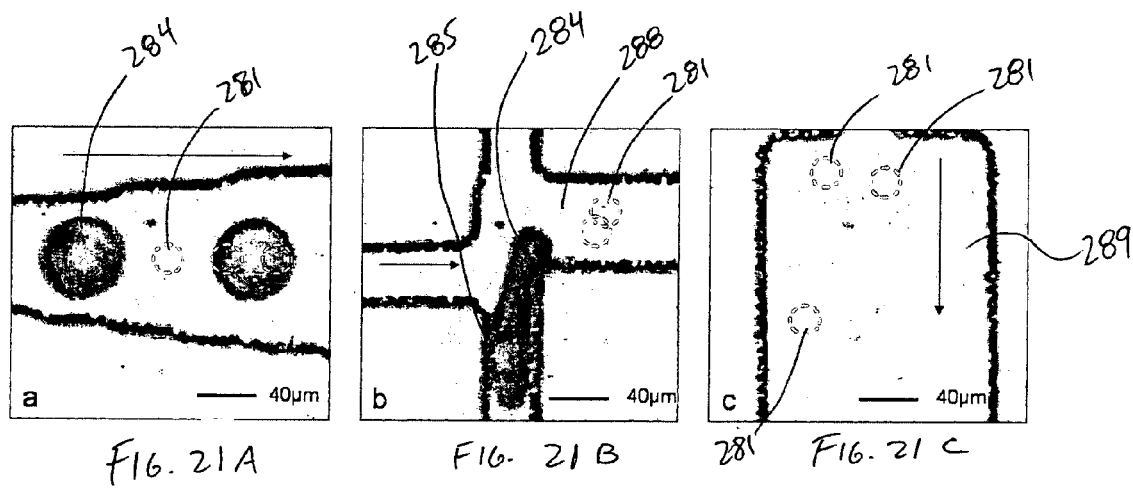
FIGS. 21A, 21B and 21C are photographs showing a method of sorting satellite droplets.

Large and small satellite droplets are first generated in the microchannel (FIG. 21A). The arrow indicates the direction of flow and the dash circles indicate the presence of a satellite droplet 281. Satellite droplets 281 are carried by the flow into the upper channel 288, while large droplets 284 are pulled by shear and pressure forces into the lower channel 285(FIG. 21B). Only satellite droplets 281 are observed in the collecting zone 289 for the upper channels 288 (FIG. 21C). The flow rates used for this example were 1.7 µL/min for water and 3.65 µ/min for oil.

In order to fuse two or more droplets together, two or more input channels 44 and 54 may be used which intersect. The intersection 55 of the two or more input channels leads to an output channel 52 for the fused droplet. For example, in a system with two input channels larger droplets enter a bifurcation joint 55 from the right hand side and get trapped due to smaller size of the neck of the vertical channel 52. Smaller droplets enter from the left hand side and are able to enter the vertical channel 52. In the process, the larger droplets experience an oscillating or pulsatile pressure that causes the droplets to rock back and forth. This rocking motion "hammers" two droplets together to form the fused droplet. The fused droplet then travels down the vertical channel 52.

Figure 19:
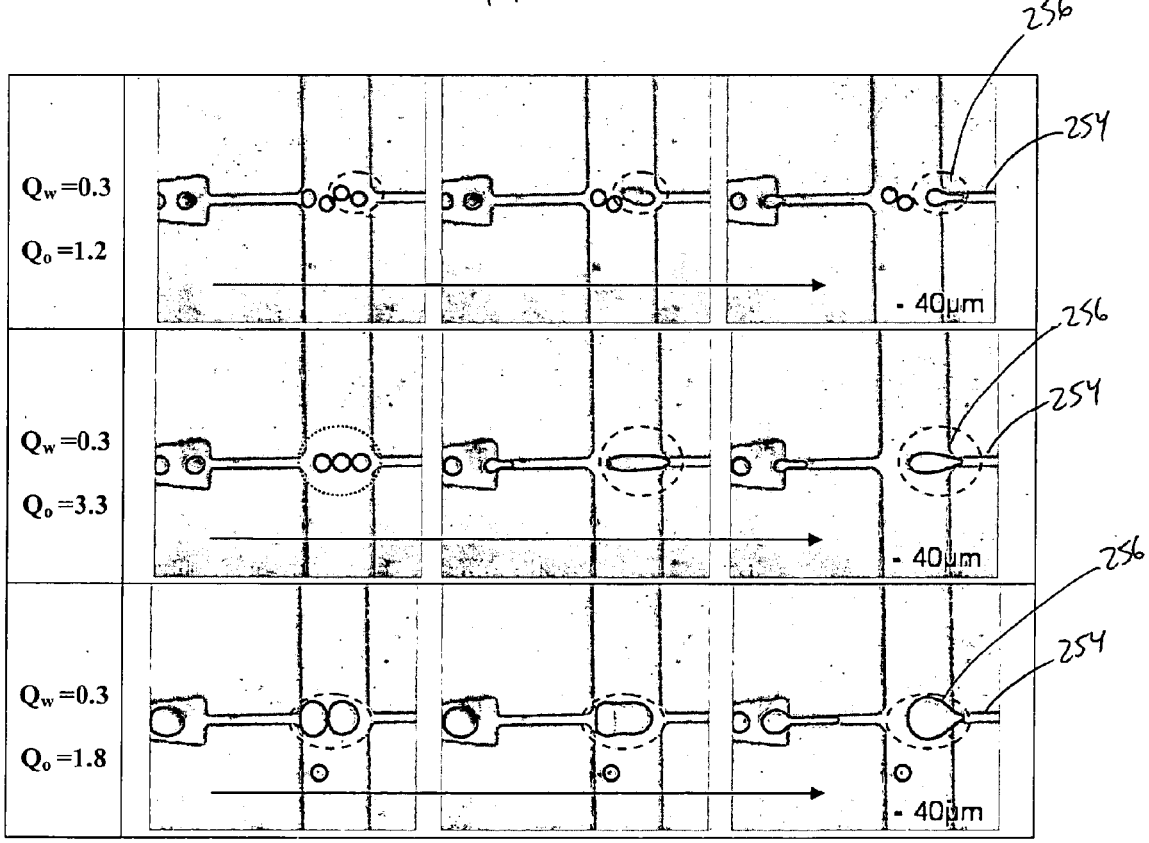
FIG. 19 is a collection of photographs showing a method of fusing droplets.

Droplets may also be fused based on a velocity gradient profile as shown in FIG. 19. Droplet fusion occurs when the fluids between the droplets are drained. This can occur either by an induced velocity gradient between the droplets or by removing fluids in between droplets at a bifurcating junction. Using the droplet focusing design, the droplets are focused into the lateral channels. The droplets are focused into the middle channel 254 due to the cancellation of the force moving in the lateral direction. The net force exerted by the inlet flow moves the fused droplet 256 into the desired middle outlet channel 254. Through controlling the width of the junction gap and the separating flow rates of the lateral channels, droplets can be fused at desired numbers and rates.

Figure 17:
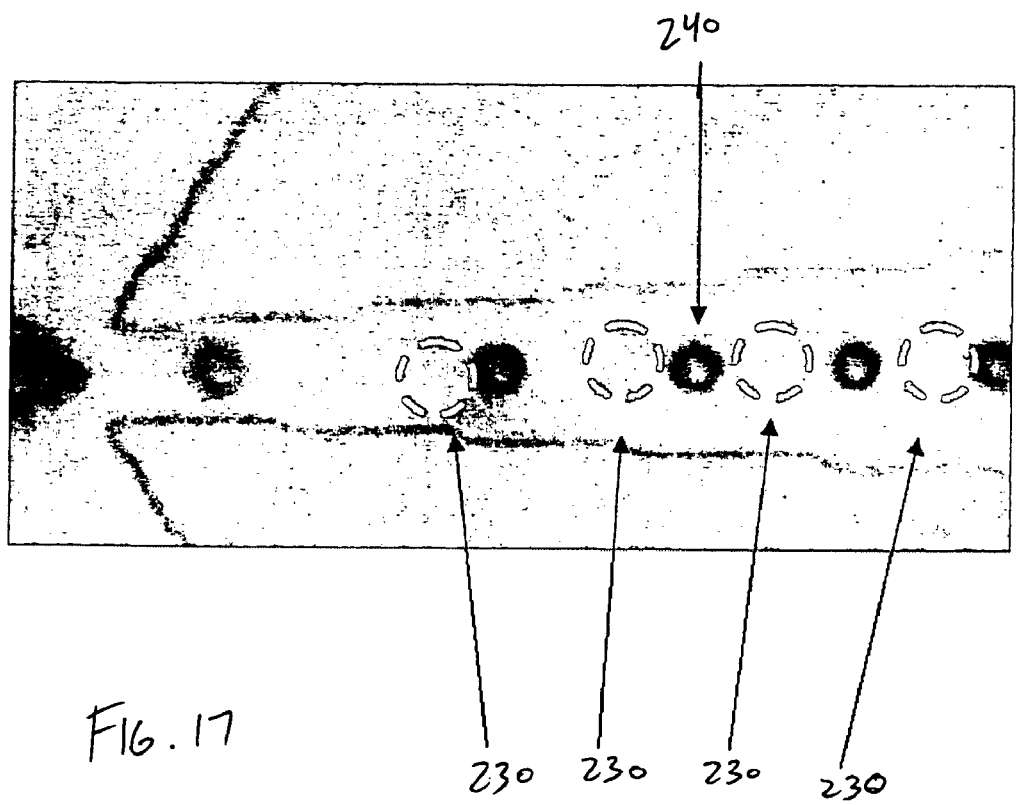
FIG. 17 is a photograph of the formation of satellite droplets.

Turning to FIG. 17, nanoparticles may be generated by satellite droplet generation. Satellite droplets 230 are created by the residues of the primary droplet 240 after breakup. Satellite droplets are generally created when higher water flow rates are used for the droplet generation system such as that described above. When satellite droplets are generated, the size of the satellite droplets 230 are controlled by varying the generation conditions for the primary droplets 240 such as by altering the flow rates of the oil and/or water phase. These satellite droplets 230 generally have a volume that is less than one percent of the volume of the original droplet 240. Satellite droplets have been generated both from water in oil emulsion systems and oil in water emulsion systems. A typical water in oil satellite droplet is shown in FIG. 17.

As indicated, complex layered vesicles may be created through a microfluidic system in accordance with the present invention that is capable of controlling and rectifying the size of emulsions. The system of the present invention may create a user defined liposome with controllable parameters including colloidal size, shape, surface properties, membrane properties, high encapsulation efficiency, programmed cell to cell recognition properties and biocompatibilities. In the medical field, applications include gene and protein therapy, cancer chemotherapy, and other clinical treatments that involve targeted drug delivery mechanisms. In computation science, individual liposomes may be designed to have specific surface and integral properties to form a unit that express live computational algorithms. In electrical sciences, cell batteries, conductors, and switches may be created from liposome with specific membrane permeability and conductance that respond to signal cues.

Many arrangements of amphiphilic vesicles can be explored that mimic real biological cells and their networks. The system of the present invention has the potential to implement many of them. For example, a nanotube-vesicle network that mimics the Golgi complex in intracellular transport of protein and lipids was recently developed. Combinatorial synthesis using amphiphilic vesicles can be carried out by sorting and fusing amphiphilic vesicles with reagents and samples, providing a digital chemistry factory for synthesis and nanoassays. By inserting various tags and biomarkers, it is also possible to use precisely sized amphiphilic vesicles for particle imaging.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit of the disclosure.

What is claimed:

1. A method of forming droplets comprising the steps of:
   forming a sheath flow from three inlet streams wherein a first stream comprising a first solution is sandwiched between second and third streams comprising a second solution;
   dissolving a first type of amphiphilic molecules in the second solution;
   generating a droplet from the first stream by controlling shear forces generated by the second and third streams acting upon the first stream, wherein the step of generating a droplet includes encapsulating the droplet with the amphiphilic molecules to form a monolayer vesicle;
   passing the monolayer vesicle through the first and second solution interface to form a bilayer vesicle, wherein the first and second solution interface is formed by a third solution flowing through two downstream input channels.

2. The method of claim 1, wherein the first and second solution comprise immiscible fluid solutions.

3. The method of claim 1, wherein the first solution comprises an aqueous solution and the second solution comprises a solvent solution.

4. The method of claim 1, wherein the first solution comprises an aqueous solution and the second solution comprises an oil solution.

5. The method of claim 1, further comprising a step of dissolving a reagent in the first solution.

6. The method of claim 5, wherein the reagent comprises a drug.

7. The method of claim 1, wherein the first and second solution interface comprises a second type of amphiphilic molecule.

8. The method of claim 7, wherein the second type of amphiphilic molecule is different from the first type of amphiphilic molecule.

9. The method of claim 1, further comprising dissolving a first type of polymer molecules in the second solution.

10. The method of claim 1, wherein controlling shear forces comprises increasing flow rates of the second and third streams.

11. The method of claim 1, further comprising controlling flow rates of the three inlet streams.

12. The method of claim 11, wherein the flow rates are controlled by one or more pumps.

13. The method of claim 9, further comprising manipulating the flow rate of the first solution to control the rate of droplet formation, wherein the first solution comprises an aqueous solution.

14. The method of claim 9, further comprising increasing the flow rate of the second solution to decrease the size of the droplets formed, wherein the second solution comprises an oil solution.

15. The method of claim 9, further comprising decreasing the flow rate of the second solution to increase the size of the droplets formed, wherein the second solution comprises an oil solution.

16. A microfluidic device for manufacturing droplets comprising:
   a first input microchannel comprising a first solution;
   second and third input microchannels comprising a second solution;
   a microchannel junction in communication with the first, second and third input microchannels;
   a plurality of pumps in communication with the three input microchannels to direct flow through the microchannels to the microchannel junction;
   an output channel in communication with the microchannel junction wherein the output channel is set to receive droplets formed from shearing forces at interfaces between the first solution and the second solution; and
   a droplet processor, wherein the droplet processor comprises a droplet splitter including a splitter input channel, two or more daughter channels in communication with the splitter input channel, a corner wall junction disposed between the daughter channels, and a second plurality of pumps in communication with the daughter channels, wherein the pumps generate a pressure gradient between the daughter channels to split a droplet at the corner wall junction of the daughter microchannels.

17. The microfluidic device of claim 16, wherein the droplet processor comprises a droplet sorter including:
   a sorter input channel;
   a daughter channel in communication with the sorter input channel;
   a second plurality of pumps in communication with the sorter input channel and the daughter channel, wherein the pumps generate a pressure gradient between the daughter channel and the sorter input channel to sort droplets.

18. The microfluidic device of claim 16, wherein the droplet processor comprises a droplet fuser including:
   a first fusion input channel;
   a second fusion input channel in communication with the first fusion input channel and having a necked region of reduced width;
   a fusion channel junction in communication with the first and second fusion input channels;
   a fusion output channel in communication with the fusion output junction.

* * * * *

UNITED STATES PATENT AND TRADEMARK OFFICE
CERTIFICATE OF CORRECTION

| | | |
|---|---|---|
| PATENT NO. | : 7,595,195 B2 | Page 1 of 1 |
| APPLICATION NO. | : 10/777470 | |
| DATED | : September 29, 2009 | |
| INVENTOR(S) | : Lee et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1387 days.

Signed and Sealed this

Twenty-eighth Day of September, 2010

David J. Kappos
*Director of the United States Patent and Trademark Office*